(12) United States Patent
Klima et al.

(10) Patent No.: US 6,431,402 B1
(45) Date of Patent: Aug. 13, 2002

(54) RECHARGEABLE DISPENSERS

(75) Inventors: William L. Klima, Stafford, VA (US); Walter F. Klima, Jr., Travelers Rest, SC (US)

(73) Assignee: Sunpat L.L.C., Stafford, VA (US)

( * ) Notice: Subject to any disclaimer, the term of this patent is extended or adjusted under 35 U.S.C. 154(b) by 0 days.

(21) Appl. No.: 09/592,949

(22) Filed: Jun. 13, 2000

Related U.S. Application Data (63) Continuation of application No. 09/247,936, filed on Feb. 11, 1999, now Pat. No. 6,073,808, which is a continuation of application No. 08/668,928, filed on Jun. 21, 1996, now Pat. No. 5,871,122, which is a continuation of application No. 08/279,978, filed on Jul. 25, 1994, now Pat. No. 5,529,216.

(51) Int. Cl.[7] ................................................ B67D 5/60
(52) U.S. Cl. ...................... 222/130; 222/136; 222/325; 222/383.1
(58) Field of Search ........................... 222/82, 80, 83.5, 222/129, 130, 136, 325, 383.1; 239/304, 305, 309, 333; 141/19, 329

(56) References Cited

U.S. PATENT DOCUMENTS 5,871,122 A * 2/1999 Klima et al. ................. 222/130

* cited by examiner

Primary Examiner—Lisa Ann Douglas
(74) Attorney, Agent, or Firm—William L. Klima; Law Offices of William L. Klima, PC

(57) ABSTRACT

Rechargeable dispensers, in particular spray bottle dispensers including at least one chemical reservoir for recharging the spray bottle dispenser. Preferably, a plurality of separate chemical reservoirs containing chemical concentrate are provided within the spray bottle dispenser to fully contain any inadvertent spillage of chemicals, and to insure a high degree of safety against accidental spills, and/or accidental ingestion by children.

11 Claims, 4 Drawing Sheets

RECHARGEABLE DISPENSERS

This is a continuation of U.S. Patent Application entitled "Rechargeable Dispensers", application Ser. No. 09/247,936, filed Feb. 11, 1999, now U.S. Pat. No. 6,073,808, which is a continuation of U.S. application Ser. No. 08/668,928, filed Jun. 21, 1996, issued as U.S. Pat. No. 5,871,122, on Feb. 16, 1999 which is a continuation of U.S. application Ser. No. 08/279,978, filed Jul. 25, 1994, issued as U.S. Pat. No. 5,529,216 on Jun. 25, 1996.

FIELD OF THE INVENTION

This invention relates to rechargeable dispensers, in particular rechargeable spray bottle dispensers, that can be recharged or refilled. Specifically, the present invention is particularly directed to spray bottle dispensers having one or more reservoirs containing chemical associated with the spray bottle dispensers so that the spray bottle dispensers can be recharged by simply adding water or some other suitable solvent, and accessing one or more of the chemical reservoirs to form a diluted chemical reagent.

BACKGROUND OF THE INVENTION

The use of spray bottles for dispensing chemical reagents (e.g., water, cleaners, soaps, insecticides, hair spray, etc.) are well known. Due to regulations limiting the amount of volatile organic carbons (VOCs) released in the atmosphere, products originally contained and dispensed through aerosols are currently being replaced with spray bottles.

Bottlers of chemical reagents typically market their products by purchasing separately empty plastic container bottles and sprayheads. The bottlers then fill, assemble, and label the completed spray bottle packages for delivery to retailers. Consumers purchase the filled spray bottles at the point-of-sale, and then consume the chemical contents of the spray bottle. Most consumers dispose of the spray bottles upon the one time use of the contents of the spray bottles. However, the spray bottles are still fully functional with respect to containing and dispensing chemical reagents, since the plastic bottles are substantially chemically resistant and the sprayheads remain fully functional after consuming the contents. Conventional point-of-sale type spray bottles can be recharged numerous times with chemical concentrate and water (i.e. at least 10 times, possibly 100 times while maintaining full operation). Thus, consumers dispose of large quantities of reusable product (i.e., empty spray bottles) having high utility value.

In today's environment of numerous regulations to control pollution, and consumer and industrial awareness for conserving resources and reducing landfill waste, it is highly desirable to promote the reuse of products that maintain their utility, and dispose of only products that no longer have any utility. Many bottlers are currently selling concentrate in various sized containers to allow consumers to recharge point-of-sale type spray bottles with their particular concentrates. However, many consumers are unwilling to adopt such methods apparently due to some inconvenience in the steps involved with the recharging process of the spray bottles. In particular, there is some inconvenience in removing the sprayhead, opening the chemical concentrate container, pouring the chemical concentrate into the empty spray bottle, adding water, and re-attaching the sprayhead to the bottle. Further, consumers apparently lack interest in recharging spray bottles due to some reluctance based on their inexperience and knowledge in mixing and diluting liquids, which is done by processing chemists for the bottlers. In addition, recharging is usually a messy undertaking due to spillage of chemical concentrate while pouring from one container to the other, overfilling, accidentally knocking over the bottle being filled due to its instability when unfilled, and other undesirable mishaps that can occur, that provide substantial inconveniences.

Importantly, sizeable containers (e.g., pint, quart, gallon, liter sizes) of chemical concentrate can be significantly hazardous to transport and handle by consumers unaware of the potent chemical properties of the chemical concentrates. Specifically, chemical spills of concentrate can damage items around the home including flooring, carpeting, countertop in kitchens and bathrooms, shelves, and other items the chemical concentrate could potentially come into contact with. Further, chemical concentrate can impose a significantly greater health risk to persons coming into accidental contact therewith potentially causing tissue burns and other damage.

Most importantly, chemical concentrate imposes a great risk to children who may accidentally ingest the chemical concentrate and become poisoned. Chemical concentrate greatly increases the chance of permanent injury or death in this regard to children versus current diluted chemical reagents contained in point-of-sale type spray bottles.

SUMMARY OF THE INVENTION

An object of the present invention is to provide a rechargeable dispenser, in particular a spray bottle dispenser having one or more chemical concentrate reservoirs associated with the spray bottle dispenser.

Another object of the present invention is to provide a rechargeable dispenser, in particular a spray bottle dispenser having one or more chemical concentrate reservoirs disposed within the spray bottle dispenser.

A further object of the present invention is to provide a rechargeable dispenser, in particular a spray bottle having one or more chemical concentrate reservoirs disposed within the spray bottle dispenser, and accessible by bursting.

An even further object of the present invention is to provide a rechargeable dispenser, in particular a spray bottle having one or more chemical concentrate reservoirs disposed within the spray bottle dispenser, and accessible by puncturing.

These and other objects can be achieved by the rechargeable dispenser, in particular the spray bottle dispenser according to the present invention.

The main concept according to the present invention is to provide a rechargeable dispenser, in particular a spray bottle dispenser package having at least one supply of chemical to allow the spray bottle dispenser to be recharged at least one time. The chemical can be in the form of a gas, liquid, semi-solid or solid. Specifically, the chemical liquid can be a one phase mixture, a two phase mixture, a dispersion or any other chemical reagent having liquid characteristics. The chemical semi-solid can be in the form of a slurry, paste, solid dispersed in a liquid that still exhibits some liquid type characteristics, and the solid can be in the form of powder, granules, tablet or other solid material form.

The chemical is preferably a concentrated chemical that is readily diluted with a solvent, in particular plain water. Preferably, the chemical can be immediately diluted, however, a chemical substance that can go into solution over a 24 hour or longer period of time can potentially be suitable for some applications.

The preferred embodiments of the present invention involve associating at least one quantity of chemical with the spray bottle dispenser itself. Specifically, the chemical is stored in some manner, and connected directly internally or externally to the spray bottle dispenser. However, the present invention is broader in scope to include packaging the chemical and spray bottle dispenser together (i.e., connected indirectly) to be marketed at the point-of-sale. In this embodiment of the invention, a consumer would purchase the package containing a supply of chemical and the spray bottle dispenser, separate at home the spray bottle dispenser that has been filled by the bottler from the package and store the chemical portion of the package separate from the spray bottle dispenser in the household. The user would then retrieve the stored chemical upon consuming the initial contents of the spray bottle dispenser for purposes of recharging the spray bottle dispenser.

The preferred embodiments of the invention store the at least one quantity of chemical directly or indirectly inside or outside the spray bottle dispenser. In the case of an indirect connection to the spray bottle dispenser, a mechanical fastener such as a plastic strip connects an external chemical reservoir to the spray bottle dispenser. In the case of a direct connection, the chemical reservoir is directly connected internally or externally to the spray bottle dispenser. The most preferred embodiments store the at least one quantity of chemical inside the spray bottle dispenser, particularly the bottle portion, to fully contain any inadvertent spills or leakage of chemical through the life of the spray bottle dispenser. These most preferred embodiments provide substantial advantages for handling, recharging and protecting household items from contact with chemical, and most importantly to prevent accidental ingestion by children. This particular point is especially important due to the much greater potency of chemical concentrate versus diluted chemical reagents currently being sold by bottlers at point-of-sale.

The most preferred embodiments also utilize conventional spray bottle dispenser components including plastic bottles, plastic sprayheads, and plastic downtubes. In order to promote products incorporating the present invention, it is particularly important to utilize the standard components that are readily available and relatively very inexpensive due to the large quantities sold and consumed. Thus, an add-on chemical reservoir for storing the chemical is highly desirable.

The most preferred add-on type chemical reservoir is an insert received within the bottle portion of the spray bottle dispenser. This type of insert can be manufactured extremely cheaply in high volume while providing all the performance characteristics necessary for a safe and reliable product. Specifically, the insert can be made with one or more chambers or cells containing chemical that can be accessed in various ways. For example, the reservoir can be sealed with membranes that can be punctured with an instrument, in particular the tip of the downtube. Alternatively, the walls of the chemical reservoir can be designed or configured so as to be readily bursted upon application of external pressure to the chemical reservoir. Adding lines of weaknesses, thinning of walls and other means for locally weakening a portion of the chemical reservoir can be implemented for use in the present invention.

Alternatively, one or more of the components of the conventional spray bottle dispenser (e.g., bottle portion, sprayhead portion, downtube) can be modified to provide the chemical reservoir. For example, the walls or bottom of the bottle portion can be modified, by molding a chemical reservoir in one or more sides of bottom of the bottle portion, the sprayhead portion can be provided with a chemical reservoir, and/or the downtube can be provided with an add-on chemical reservoir or the walls of the downtube can be molded to provide a chemical reservoir. However, all of these approaches will initially be substantially greater in cost due to the modification of conventional components not necessitated by the use of an insert according to the present invention.

The insert according to the present invention can take on many different forms and configurations. A first preferred embodiment of the insert is defined by a cylinder having one or more chambers or cells disposed therein. The interior of the cylinder can be provided with one or more bisecting walls to define the chambers along the length thereof. A plastic cylinder having one or more bisecting walls can be easily extruded in plastic. The top and bottom of the one or more chambers of the insert are sealed by upper and lower sealing membranes. The membranes can be films, foils, composites of films and foils, or any other suitable composite that is both chemically resistant and subject to being punctured readily by an instrument, in particular, the tip of the downtube, or can be made to burst.

The upper and lower sealing membranes can be connected to the insert by bonding, adhesive bonding, thermal bonding, sonic welding, or suitable methods for forming a liquid tight seal (e.g., hermetic seal).

This embodiment of the insert can be marketed inside a filled spray bottle dispenser at point-of-sale. The downtube extends through an open chamber of this insert down into the lower portion of the bottle portion to access premixed chemical reagent added by the bottler during manufacture. After consumption of the chemical reagent, a user unscrews the sprayhead and lifts the downtube from the bottle portion. The insert is rotated so that one chemical reservoir is now positioned where the open chamber was previously positioned (i.e., now registered for being punctured by the downtube). The user then forces the tip of the downtube through the upper sealing membrane, down through the chamber, and then punctures the lower sealing membrane. Water can be added through the open chamber of the insert before or after the step of accessing the chemical reservoir by puncturing with the downtube. This configuration allows the chemical to be always stored within the confines of the spray bottle dispenser, and minimizes the steps needed for recharging the spray bottle dispenser.

The consumer will experience little inconvenience in removing the sprayhead and downtube from the bottle portion, rotating the insert, puncturing the chemical reservoir, adding water through the open chamber of the insert, and reassembling the sprayhead portion to the bottle portion. Further, the chemical concentrate stored within the insert is extremely safe for handling and preventing accidental consumption by children (i.e., a child would have to successfully unscrew the sprayhead portion from the bottle portion, fully remove the downtube from the bottle portion, and successfully puncture the insert). Further, even in the event of puncture of the insert by a child, the access opening through the upper sealing membrane would be sufficiently small to substantially limit spilling and containing most chemical from being easily ingested by a child. Thus, the present invention provides substantial safeguards over current methods of selling large quantities of chemical concentrate at the point-of-sale, and subsequently having the consumer handle and mix the chemical concentrate in his or her home.

This particular insert can have one, two, three, four or more separate chambers or cells. For example, in the case of four cells, one cell would be an open cell through which the downtube is initially placed by the bottler during assembly when the spray bottle dispenser is provided with an initial charge of diluted chemical. Thus, in this example, there remains three cells that can be utilized as three separate chemical reservoirs. This four cell configuration would allow the user to initially consume the premixed diluted chemical reagents of the spray bottle dispenser, and then recharge the spray bottle dispenser three more times prior to consuming all the chemical contained in the spray bottle dispenser. If the consumer then disposed of the spray bottle dispenser at that point, this would provide a three time improvement over the current practice of consumers utilizing a spray bottle dispenser one time prior to disposal. Thus, the consumption of spray bottle dispensers could be reduced three-fold (i.e., one fourth the waste) if fully implemented.

However, this invention can even provide for an even greater improvement over current practices by consumers. Specifically, this insert can also be sold at the point-of-sale as a separate item that could be added to conventional point-of-sale type spray bottle dispensers having no inserts after the initial consumption of the contents, or for use with spray bottle dispensers having inserts according to the present invention after the complete chemical consumption of the inserts initially sold with the units.

This new system would greatly decrease the shipping weight and costs associated therewith, decrease retail shelf space for marketing the product, and most importantly greatly decrease the consumption and waste of plastic material. Specifically, the volume of plastic needed to make the four chamber insert described above would be a small fraction compared with the weight of plastic of four conventional spray bottle dispensers based on equal amounts of useable diluted chemical reagent. Further, the insert when the chemical is completely consumed has little utility value versus the utility value of an emptied conventional spray bottle dispenser that can be reutilized numerous times. Further, conventional spray bottle dispensers are substantially much greater in cost to produce relative to the insert according to the present invention, and would conserve significant labor and other direct and indirect costs associated with the production of conventional spray bottle dispenser components versus the insert according to the present invention. Further, the insert according to the present invention can readily be recycled, and could potentially be refilled if an adequate system were developed to reprocess such inserts, however, more than likely the inserts would be disposed of by consumers based on convenience factors.

A second embodiment of an insert according to the present invention involves forming a strip of chemical reservoirs that can be disposed within the bottle portion of the spray bottle dispenser. The strip of chemical reservoirs can be made at high speed, and would most likely be made in a continuous strip and cut to length when completed for insulation in each spray bottle dispenser. The strip type insert can be manufactured by a high speed molding technique such as vacuum forming the chemical reservoirs from a plastic strip, filling the chemical reservoirs with chemical, and sealing the chemical reservoirs. This completed strip is then cut to length based on the number of reservoirs to be added to the spray bottle dispenser, and is preferably attached by adhesive or other technique to the inside surface of the bottle portion. The chemical reservoirs made of the plastic strip are made in such a manner so that the chemical reservoirs can be punctured by an instrument, in particular, the tip of the downtube, or can be made to burst by adding external pressure to the chemical reservoir. A user can burst one or more (i.e., one, two, three, etc.) of the chemical reservoirs to specifically tailor the concentration of the diluted chemical reagent. Thus, the concept according to the present invention allows the consumer some latitude in selecting concentration levels currently unavailable with conventional spray bottle dispensers.

In a third embodiment, a plurality of separate cylindrical chemical reservoirs can be added to the inside of the bottom portion. The cylinder chemical reservoirs are provided with an upper sealing membrane that can be punctured by an instrument, in particular the tip of the downtube. The cylinder reservoirs can be separate units or connected together by a strip, or by some other manner. The cylindrical chemical reservoirs are preferably located at the bottom wall of the bottom portion to allow easy access by the tip of the downtube during a puncturing operation. In a fourth embodiment, cylindrical chemical reservoirs bridge the side walls of the bottle portion. The cylinder reservoirs are made so they can be burst by simply pressing together the walls at the location of the particular cylinder reservoir.

In a fifth embodiment, separate donut-shaped chemical reservoirs are added to a conventional downtube. The donut-shaped reservoirs can be made so as to be punctured or burst for chemical access. Alternatively, one or more small holes through the inner surface of the donut-shaped reservoirs can be provided and sealed by the downtube itself (adhesive can also be provided to insure adequate sealing). In this type of arrangement, the chemical inside the donut-shaped reservoir can be accessed by simply pulling the donut-shaped chemical reservoir off the downtube exposing the opening through the inner wall of the donut-shaped reservoir. The donut-shaped reservoir can be removed by unscrewing the sprayhead portion from the bottle portion, lifting the downtube until the lowermost donut-shaped reservoir is located at or near the opening of the bottle portion, holding the donut-shaped reservoir by the fingertips of one hand at the opening to the bottle portion, and then lifting with the other hand the downtube so as to detach the donut-shaped reservoir from the downtube, and then allowing the donut-shaped reservoir to drop into the bottle. Water is added before or after to dilute the concentrate to form the diluted chemical reagent.

In a sixth embodiment, an insert is provided with a plurality of reservoirs in a stepped and stacked array. The top reservoir is thinner and deeper compared with a bottom reservoir that is wider and shallower. One or more reservoirs having dimensions in between that of the top and bottom reservoirs can be provided therebetween. This stepped and stacked arrangement allows easy access to any of the chemical reservoirs by an instrument, in particular the tip of the downtube for puncturing a membrane sealing each reservoir.

In a seventh embodiment, a plurality of reservoirs are provided in an insert and a stacked arrangement. Each reservoir is sealed at the top and bottom with a sealing membrane. A person using a spray bottle dispenser containing this insert initially punctures the upper and lower sealing membranes of the upper reservoir during a first recharging operation, punctures the upper and lower sealing membranes of the middle reservoir to access chemical in the middle reservoir during a second recharging operation, and does the same to the third chemical reservoir in the third recharging operation.

DETAILED DESCRIPTION OF THE PREFERRED EMBODIMENTS

Definitions

The spray bottle dispenser according to the present invention includes one or more reservoirs containing chemical or chemicals (i.e., chemical reservoirs).

The chemical reservoir can be a separate unit indirectly associated with the spray bottle dispenser by packaging, or directly associated to the spray bottle dispenser by connection to the spray bottle dispenser externally or internally. Preferred embodiments contain the one or more chemical reservoirs internally, most preferably contained inside the bottle portion to fully contain any inadvertent chemical spill or release from the one or more chemical reservoirs.

In the case of an external connection with the spray bottle dispenser, the chemical reservoir can be connected by a separate piece mechanical fastener such as a plastic tab or strip connector connecting the chemical reservoir to the bottle portion, sprayhead portion, or connected to both the bottle portions and sprayhead portions of the spray bottle dispenser.

Alternatively, the chemical reservoir can be formed as an integral portion of the bottle portion, sprayhead portion, and/or downtube. In the integral embodiments, the chemical reservoir can be connected by adhesive, plastic welding, plastic forming (e.g., molding), or by other means to directly integrate the reservoir into the spray bottle dispenser components.

In a preferred embodiment, the spray bottle dispenser is provided with one or more separate chemical reservoirs to allow the spray bottle dispenser to be recharged one or more times. In a most preferred embodiment, the spray bottle dispenser is provided with one or more chemical reservoirs to allow the user to access more than one chemical reservoirs during a single recharge to increase (e.g., double, triple, quadruple, etc.) the chemical concentration of the recharging mixture in the particular recharging operation.

The chemical reservoirs can be identical units to simplify and reduce costs of manufacturing, or alternatively, can be different size, shape and/or configuration of chemical reservoirs. For example, both internally and externally connected chemical reservoirs can be applied, and/or integral and separate type chemical reservoirs can be combined.

The one or more chemical reservoirs of the spray bottle dispenser contain chemical or chemicals. Specifically, the reservoir can be filled or partially filled with only a single chemical compound, a one phase mixture of chemicals, a two phase mixture of chemicals, a dispersion, or any other liquid type chemical(s). Alternatively, the chemical(s) can be in the form of a solid such as a tablet, powder, or granules, or semi-solid such as a thick slurry. In any event, the reservoir should contain a chemical reagent that is readily diluted or dissolvable with a solvent, particularly plain water.

A preferred embodiment of a spray bottle dispenser 10 according to the present invention is shown in FIGS. 1–5. The spray bottle comprises a sprayhead portion 12 including an inner threaded coupler 16 threaded onto an outer threaded neck of the bottle portion 14. A downtube 18 is connected to the sprayhead 12 portion, and extends down into the bottom of the bottle portion 14.

Figures 2, 3, 4, 5:
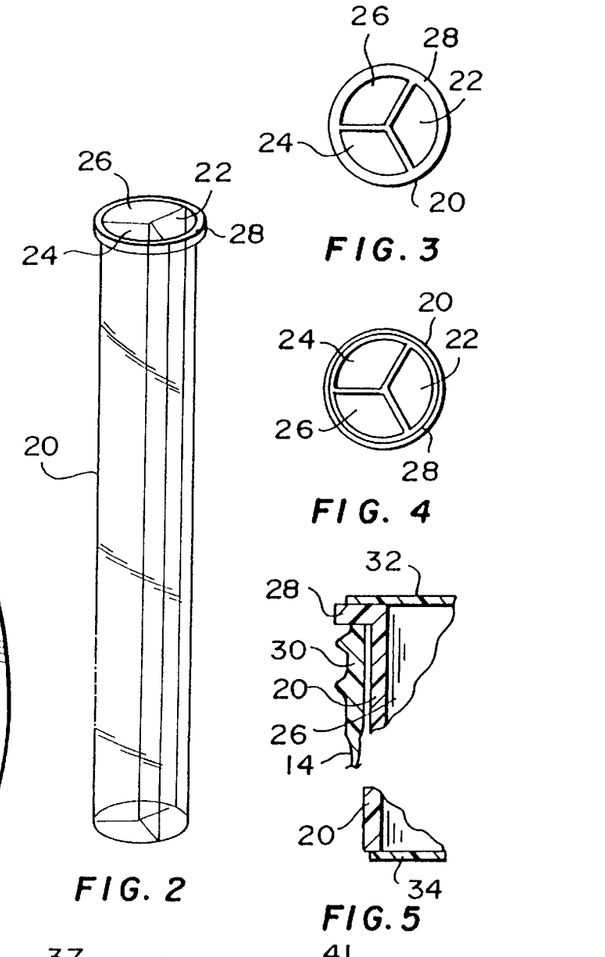
FIG. 2 is a perspective view of the insert having three (3) separate chambers or cells defining two chemical reservoirs and an empty chamber with the insert removed from the bottle portion of the spray bottle dispenser shown in FIG. 1.
FIG. 3 is a top planer view of the insert shown in FIG. 2.
FIG. 4 is a bottom planer view of the insert shown in FIG. 2.
FIG. 5 is a partial detailed view showing the lip of the insert being supported by the mouth of the bottle portion of the spray bottle dispenser shown in FIG. 1 to suspend the insert in the bottle.

The spray bottle dispenser 10 is fitted with an insert 20 having three separate chambers 22, 24 and 26. In the embodiment of the insert 20 as shown in FIG. 2, the insert is provided with a rim 28 on an upper portion of the insert 20. The rim 28 has a diameter greater than the inner diameter of the threaded neck 30 of the bottle 14, as shown in FIG. 5. Thus, the rim 28 functions to suspend the insert 20 within the bottle 14.

The chambers 22, 24 and 26 are used for storing a predetermined quantity of liquid concentrate in each chamber. The chambers 24 and 26 are sealed at the top by an upper sealing membrane 32 and the bottom of the chambers 24 and 26 are sealed by lower sealing membrane 34 as shown in FIG. 5. The chamber 22 is open (i.e., not covered by sealing membranes 32, 34) to accommodate the downtube 18, and also allow solvent such as water to be added through the insert into the bottle portion 14.

The insert 20 is preferably made of suitable plastic material, and the upper sealing membrane 32 and lower sealing membrane 34 are preferably made of suitable plastic film, metal foil, or other suitable single or composite layer. The membranes should be chemically resistant to the contents and suitable for making a liquid tight seal with the insert. The upper sealing membrane 32 and lower sealing membrane 34 can be attached to the insert 20 by various means. For example, the membranes 32 and 34 can be attached by bonding, adhesive bonding, thermal welding, sonic welding, or by any suitable conventional means for providing a liquid tight seal (e.g., hermetic seal) of the chambers 22, 24 and 26.

Figure 1:
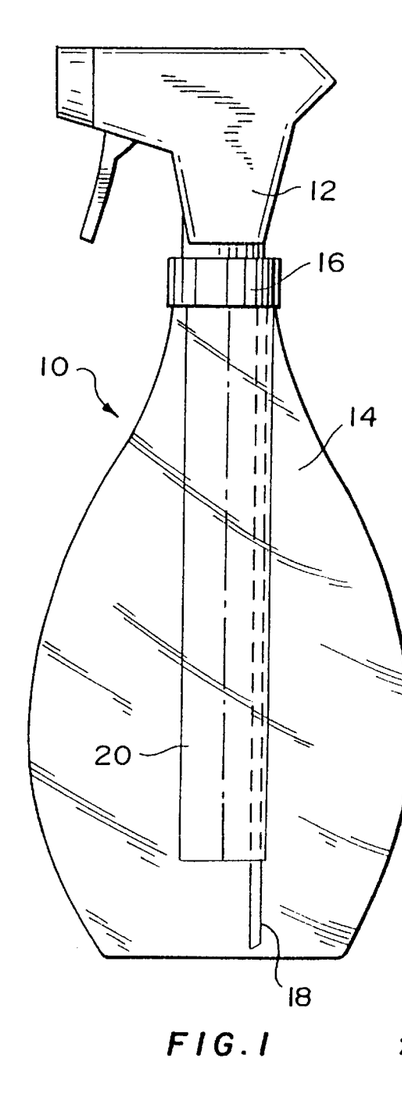
FIG. 1 is a side elevational view of a first preferred embodiment of the spray bottle dispenser according to the present invention.
Figure 6A:
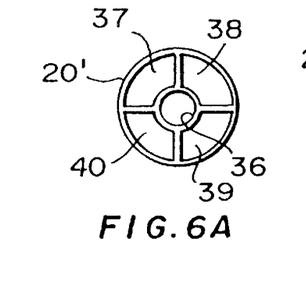
FIG. 6A is a preferred alternative insert having an empty center chamber to accept a downtube centered in the mouth of the bottle portion, and having four (4) chemical reservoirs.
Figure 6B:
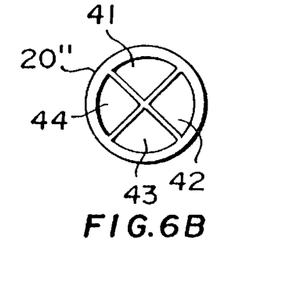
FIG. 6B is a preferred alternative insert having four (4) chambers or (i.e., three chemical reservoirs and one empty chamber) cells, instead of three (3) chambers of the insert shown in FIG. 2.

Various other inserts having suitable configurations can be substituted for the insert 20 shown in FIG. 1. For example, a five (5) chamber insert 20' having an open center chamber 36 and four (4) chemical chambers 37, 38, 39 and 40, is shown in FIG. 6A, and a four (4) chamber insert 20" having chambers 41, 42, 43 and 44, is shown in FIG. 6. Further, the length of the insert relative to the length of the bottle 14 can be substantially varied based on different concentration levels of the concentrate utilized in the insert. Specifically, higher concentration concentrate requires less volume in the chambers of the insert, and thus reducing the needed length of the insert.

The insert 20 can be made by a variety of different techniques, however, injection molding or extruding techniques are the most suitable methods of manufacture.

The insert 20 can be marketed inside the bottle at the point-of-sale, and/or can be marketed as a separate unit that can be inserted into a conventional spray bottle.

In the case of the insert being marketed inside the bottle, all three (3) chambers 22, 24 and 26 can initially be chemical reservoirs. The bottle is filled with water or other suitable diluting liquid and the top sealing membrane 32 and bottom sealing membrane 34 sealing the chamber 22 can be punctured by the tip of the downtube 18 during insertion of the downtube into the bottle portion prior to securely fastening the sprayhead to the bottle portion to complete the packaging assembly. Alternatively, the chamber 22 may be open (i.e., devoid of any liquid concentrate, as discussed above) and the bottle is initially filled with proper concentration diluted chemical reagent liquid ready to be marketed with the downtube 18 passed through the open chamber 22 during assembly. In the embodiment having three (3) chambers as shown in FIG. 3, two additional doses of concentrate contained in chambers 24 and 26 can be sequentially punctured by the consumer to dose a bottle with concentrate. The bottle 14 can be supplied with water through empty chamber 22 before or after the dosing step by the consumer.

Figures 7, 8, 9, 10, 11:
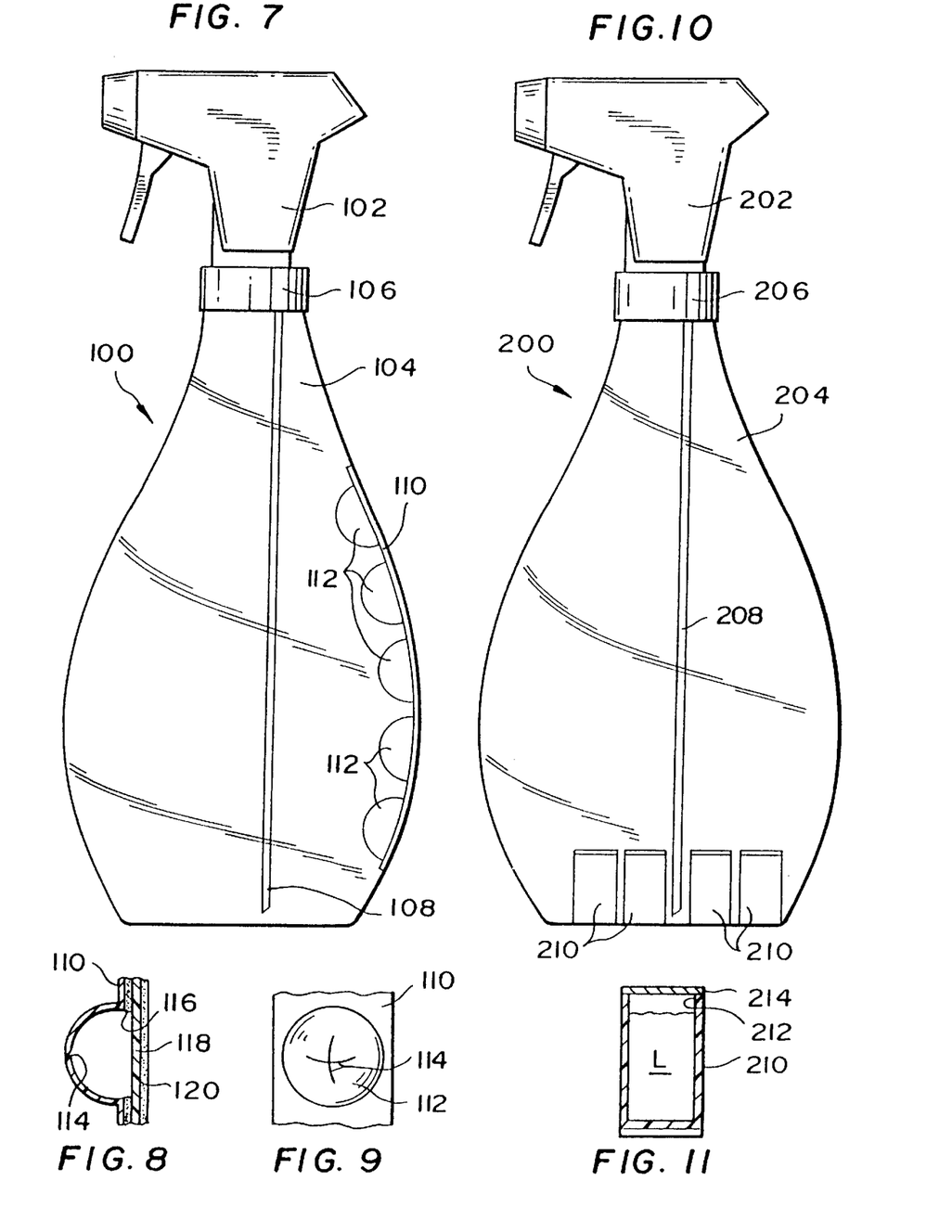
FIG. 7 is a side elevational view of a second preferred embodiment of the spray bottle dispenser according to the present invention.
FIG. 8 is a partial detailed side cross-sectional view through one reservoir of the spray bottle dispenser shown in FIG. 7.
FIG. 9 is a perspective head-on view of the outer surface of the reservoir shown in FIG. 8, showing the lines of weakness in the reservoir.
FIG. 10 is a side elevational view of a third preferred embodiment of the spray bottle dispenser according to the present invention.
FIG. 11 is a side cross-sectional view of one reservoir of the spray bottle dispenser shown in FIG. 10.

A second embodiment of a spray bottle 100 according to the present invention as shown in FIGS. 7–9. The spray bottle 100 comprises a sprayhead portion 102 and a bottle portion 104. The sprayhead portion 102 includes a threaded coupler 106 for connecting the sprayhead portion 102 to a threaded neck of the bottle portion 104. A downtube 108 is connected to the sprayhead portion 102, and extends down to the bottom of the bottle portion 104.

In this second embodiment, a strip 110 having a plurality of chemical reservoirs 112 containing liquid concentrate is provided in the bottle portion 104. The strip 110 is attached to an inside surface of one wall of the bottle portion 104. The specific location of the strip 110 can be changed from that shown in FIG. 7 to other locations on the side and/or bottom of the bottle portion 104. Each chemical reservoir 112 is made in a manner so that it can be ruptured either by forcing the tip of the downtube 108 into the surface of the reservoir 112, or by pinching the outside walls of the bottle portion 104 together to burst one or more chemical reservoirs 112. For example, the chemical reservoir 112 can be made so that its wall has one or more lines of weakness 114, as shown in FIGS. 8 and 9.

The strip 110 is preferably made in an infinite length, and then cut to length for the particular application. Thus, different size bottles could potentially have more or less number of individual chemical reservoirs 112. Further, making the strip 112 in an infinite manner would allow for high speed production of the strip 110 for high speed insertion during bottling. In the embodiment shown in FIG. 8, the strip 110 is provided with an adhesive layer 116 connecting a sealing layer 118 to the back of the strip 110. Another adhesive layer connects the strip 110 to the wall of the bottle portion 104.

A third embodiment of a spray bottle dispenser 200 according to the present invention is shown in FIGS. 10 and 11. The spray bottle dispenser 200 comprises a sprayhead portion 202 and a bottle portion 204. The sprayhead portion 202 includes a threaded coupler 206 for connecting the sprayhead 202 to a threaded neck of the bottle portion 204. A downtube 208 is connected to the sprayhead portion 202, and extends down to the bottom portion of the bottle portion 204.

In this third embodiment, a plurality of chemical reservoirs 210 are provided at the bottom of the bottle portion 204. The chemical reservoirs 210 can be individual chemical reservoirs, or alternatively, can be connected together by mechanical coupler in some manner. In any event, the chemical reservoirs 210 must be configured in such a manner so that they can be passed through the open mouth of the bottle portion 204.

A detailed cross-sectional view of one of the chemical reservoirs 210 is shown in FIG. 11. The chemical reservoir 210 can be cylindrical or some other suitable shape with an open end 212 at a top portion thereof. The open end 212 is sealed with a metal foil 214 that can be punctured by an instrument, in particular the tip of the downtube 208. The reservoir 210 is at least partially filled with a chemical concentrate liquid L.

In use, the spray bottle dispenser 200 is filled by the bottler with diluted chemical reagent. The four (4) chemical reservoirs 210 are each at least partially filled with a chemical concentrate. Thus, this particular configuration allows for four (4) recharging operations. Each recharging operation begins with unscrewing the threaded coupler of the sprayhead portion 202 from the spray bottle 204, and slightly lifting the sprayhead portion 202 upwardly until the tip of the downtube 208 clears the upper surfaces of the reservoirs 210. The user then forces the tip of the downtube 208 through the metal foil 214 of one of the reservoirs 210 causing it to be punctured. The bottle portion 204 is filled with water either before or after the step of accessing one of the chemical reservoirs 210.

Figure 12:
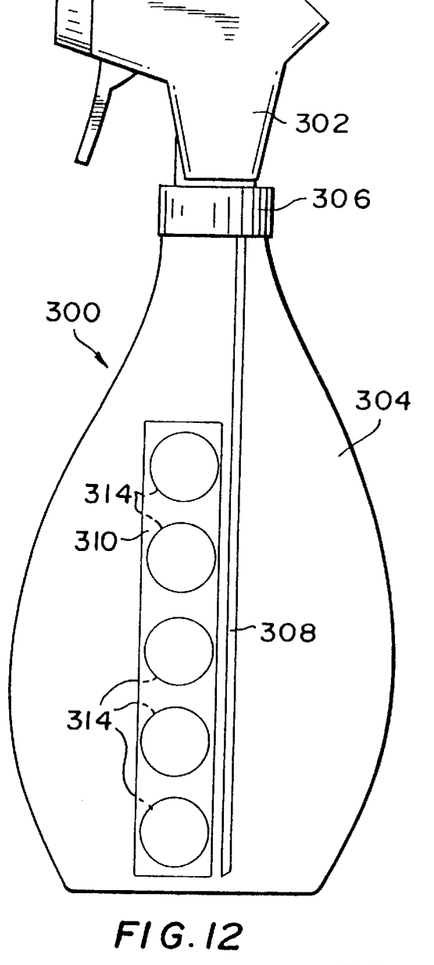
FIG. 12 is a side cross-sectional view of a fourth preferred embodiment of the spray bottle dispenser according to the present invention.
Figures 13, 14:
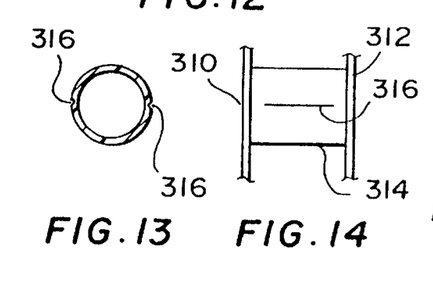
FIG. 13 is a cross-sectional view through one reservoir of the spray bottle dispenser shown in FIG. 12.
FIG. 14 is side elevational view of the one reservoir shown in FIG. 13, showing it bridging between the sides of the bottle portion, and connected at both ends to the sides of the bottle portion.

A fourth embodiment of a spray bottle dispenser 300 according the present invention is shown in FIGS. 12 to 14. The spray bottle dispenser 300 comprises a sprayhead portion 302 and a bottle portion 304. The sprayhead portion 302 includes a threaded coupler 306 for connecting the sprayhead portion 302 to a threaded neck of the bottle portion 304. A downtube 308 is connected to the sprayhead portion 302, and extends down to the bottom portion of the bottle portion 304.

In this fourth embodiment, strips 310 and 312 connect together a plurality of chemical reservoirs 314. Five (5) reservoirs are shown in FIG. 12, however, either more or less reservoirs can be utilized.

The reservoir 314 is provided with lines of weakness 316 as shown in FIGS. 13 and 14. The lines of weakness allow the reservoir 314 to burst upon application of force to the reservoir 14. For example, the sides of the bottle portion 304 can be squeezed at the location of one of the chemical reservoirs 314 causing it to burst.

The strips 310 and 312 are preferably secured to the walls of the bottle portion 304. For example, the strips 310 and 312 can be adhered with adhesive, or connected by sonic welding or thermal welding. The strip 310 and chemical reservoirs can be molded from plastic.

In this particular embodiment, the spray bottle dispenser 300 is recharged by bursting one or more of the reservoirs 314. The more reservoirs 314 that are burst, the stronger in concentration the resulting diluted chemical reagent will be. A solvent such as water can be added before of after the bursting operation. The spray bottle dispensers are preferably filled with diluted chemical reagent by the bottler containing the plurality of reservoirs 314 to allow numerous recharging operations.

Figure 15:
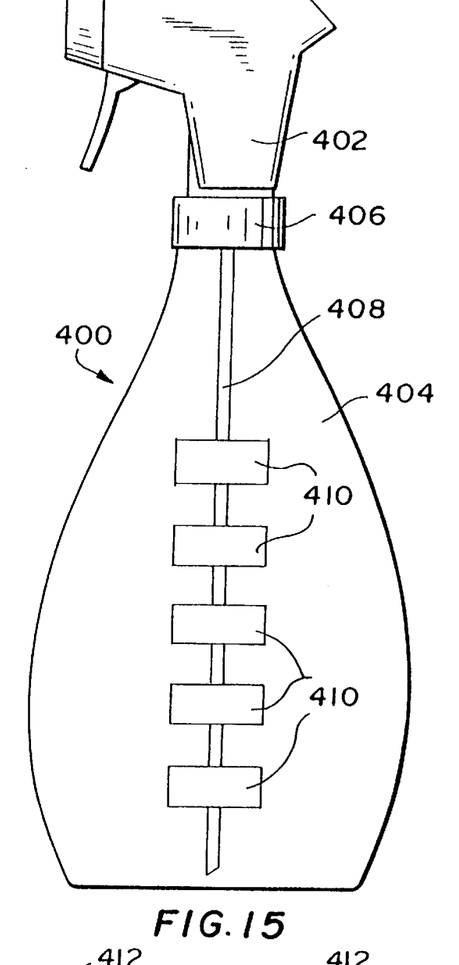
FIG. 15 is a side elevational view of a fifth preferred embodiment of the spray bottle dispenser according to the present invention.
Figure 16:
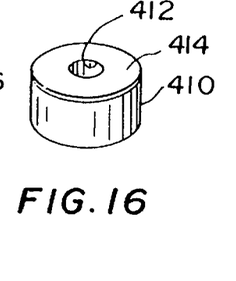
FIG. 16 is a perspective view of one donut-shaped reservoir of the spray bottle dispenser shown in FIG. 15.
Figure 17A:
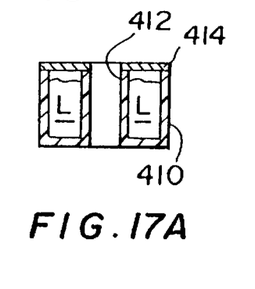
FIG. 17A is a side cross-sectional view of the donut-shaped reservoir shown in FIG. 16.
Figures 17B, 18, 19, 20, 21, 22, 23, 24, 25:
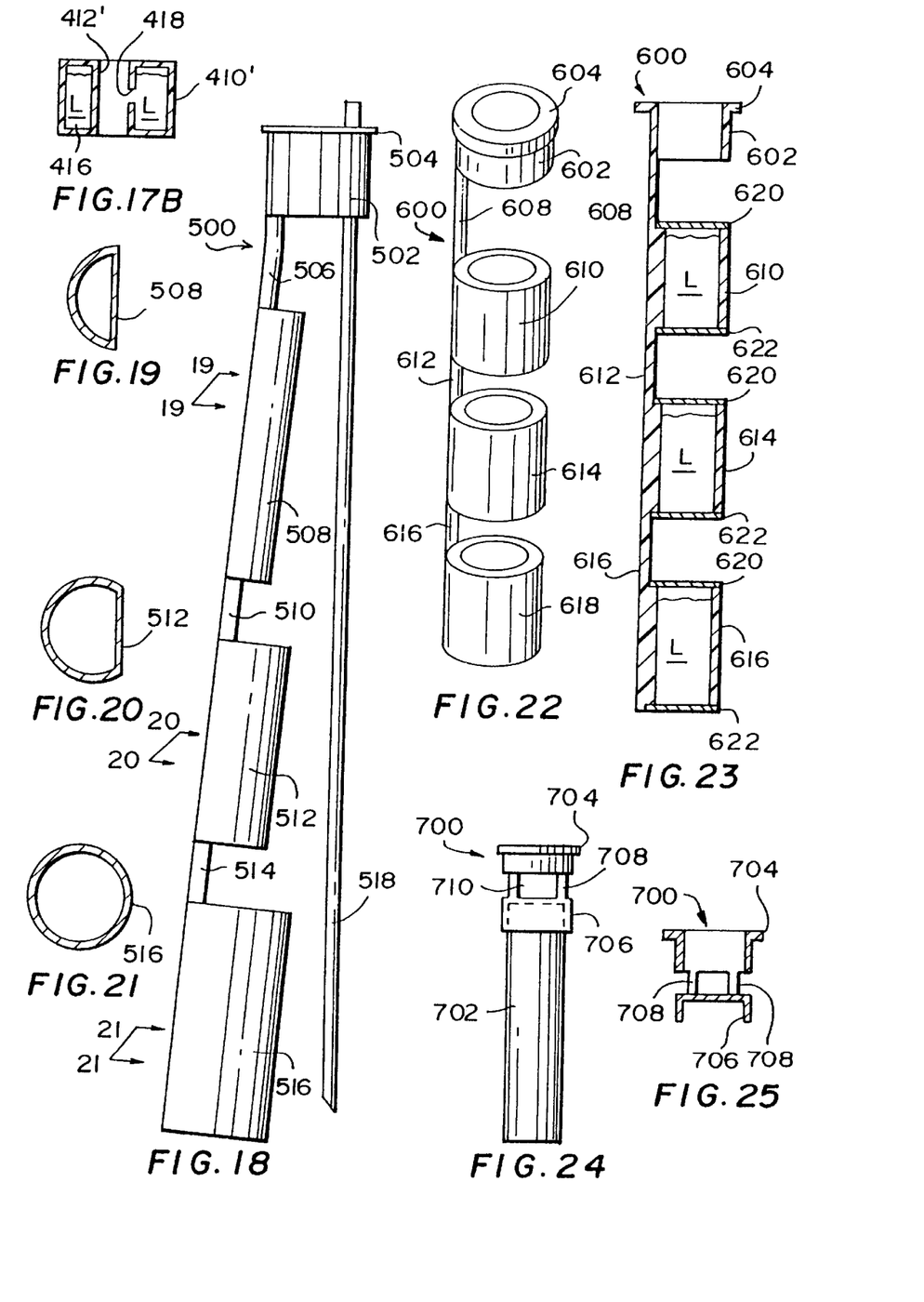
FIG. 17B is a side cross-sectional view of an alternative donut-shaped reservoir.
FIG. 18 is an insert of a sixth preferred embodiment of the spray bottle dispenser according to the present invention.
FIG. 19 is a cross-sectional view of the upper reservoir of the insert as indicated in FIG. 18.
FIG. 20 is a cross-sectional view of the middle reservoir of the insert as indicated in FIG. 18.
FIG. 21 is a cross-sectional view of the lower reservoir of the insert as indicated in FIG. 18.
FIG. 22 is an insert of a sixth preferred embodiment of the spray bottle dispenser according to the present invention.
FIG. 23 is a side longitudinal cross-sectional view of the insert shown in FIG. 22.
FIG. 24 is a side elevational view of an insert with a mechanical connector according to the present invention.
FIG. 25 is a cross-sectional view of the mechanical coupler, as shown in FIG. 24.

A fifth embodiment of a spray bottle dispenser 400 according to the present invention is shown in FIGS. 15 to 17. The spray bottle dispenser 400 comprises a sprayhead portion 402 and a bottle portion 404. The sprayhead portion 402 includes a threaded coupler 406 for connecting the sprayhead portion 402 to a threaded neck of the bottle portion 404. A downtube 408 is connected to the sprayhead portion 402, and extends down to the bottom portion of the bottle portion 404.

In this fifth embodiment, a plurality of donut-shaped chemical reservoirs 410 are provided on the downtube 408. Specifically, the donut-shaped chemical reservoirs 410 each have a center hole 412 through which the downtube 408 passes. The chemical reservoirs 410 are provided with a metal foil 414 for sealing an upper end of the chemical reservoir 410 for containing the chemical reagent liquid L, as shown in FIGS. 16 and 17.

In use the spray bottle dispenser 400 is initially filled by the bottler with dilute chemical reagent and sold at the point-of-sale. After the initial consumption of the diluted chemical reagent, a user unscrews the sprayhead portion 402 from the body portion 404 and lifts the downtube 408 from the bottle portion 404. The user then grips the lowermost reservoir 410 and simple pulls it off the end of the downtube 408, and then punctures the metal foil 414 with and instrument, in particular the tip of the downtube 408. The punctured reservoir 410 is dropped into the bottle portion 410. A solvent such as water is added to the bottle portion 404 before or after the step of puncturing the reservoir 410. The spray bottle dispenser 400 is then reassembled by screwing the sprayhead portion 402 onto the bottle portion 404.

Another embodiment of a donut-shaped chemical reservoir 410' is shown in FIG. 17B. This chemical reservoir 410', is sealed at the top to define an annuler chamber 416 containing the chemical concentrate liquid L. One or more small holes 418 are provided on the internal wall of the throughhole 412' to allow chemical to escape therethrough. The hole 418 is sealed by the outer surface of the downtube when the downtube is inserted through the center hole 118. Further, a thin layer of adhesive or sealant can be applied between the donut-shaped reservoir and the downtube to further ensure sealing of the hole 418.

A sixth embodiment of a spray bottle dispenser utilizes insert 500 as shown in FIGS. 18 to 21. The insert 500 comprises a cylinder portion 502 having a lip portion 504, a connector portion 506 connecting the cylinder portion 502 to an upper reservoir 508, a connector portion 510 connecting the upper reservoir 508 to a middle reservoir 512, and a connector portion 514 connecting the middle reservoir 512 to the lower reservoir 516. A downtube 518 is shown passing through the hollow cylinder portion 502, however, is not connected to the insert 500.

The reservoirs 508, 512 and 516 are in a stacked and stepped arrangement. The upper reservoir 508 is thinner in width and deeper in depth compared with the lower reservoir 516. The middle reservoir 512 has dimensions between those of the upper reservoir 508 and lower reservoir 516. This stepped and stacked arrangement allows access by an instrument to puncture sealing membranes (not shown) sealing each reservoir 508, 512, 516 while the insert remains in the bottle portion of the spray bottle dispenser.

A seventh embodiment of a spray bottle dispenser having an insert 600 is shown in FIGS. 22 and 23. The insert 600 comprises a cylindrical portion 602 having a lip portion 604, a connector portion 608 connecting the cylindrical portion 602 to upper reservoir 610, a connector portion 612 connecting the upper reservoir 610 to middle reservoir 614, and a connector portion 616 connecting the middle reservoir 614 to lower reservoir 618. The top and bottom of each reservoir 610, 614 and 618 are open, and each sealed by upper metal foil 620 and a lower metal foil 622.

In use, the spray bottle dispensers are filled with diluted chemical reagent initially by the bottler, and the downtube is passed only through the cylinder portion 602. After consumption of the initial diluted chemical reagent, the user withdraws the downtube above the level of the upper reservoir 610, and forces the tip of the downtube through the upper metal foil 620 and lower metal foil 622 of the reservoir 610 releasing the chemical concentrate liquid into the bottle portion. A solvent such as water is added before or after the step of accessing the chemical concentrate liquid. After puncturing the metal foil 620 and 622, the downtube is lifted upwardly and then passed between the cylinder portion 602 and the side of the reservoir 610. Alternatively, the downtube can be threaded through the reservoir 610 and down along the side of the middle reservoir 614 so as not to puncture the chemical reservoir 614. The connector portion 608, 612 and 616 are substantially flexible enough to act as hinges to move the lower reservoirs out of the way so as not to be punctured by the downtube during the insertion operation of the downtube.

In an alternative embodiment, only the upper portion of each reservoir is provided with a membrane that can be punctured with the bottoms being molded portions of the reservoirs, and not readily subject to being punctured.

In an eighth embodiment, a mechanical coupler 700 is connected to an insert 702. The insert 702 is identical to the insert shown in FIG. 2, however, with no lip portion 28. The mechanical coupler includes a lip portion 704 and a connector portion 706 connected together by four (4) standoffs 708 (only two are shown in FIGS. 24 and 25). The connector portion 706 is connected to an upper portion of the insert 702, by interference fit, adhesive, sonic welding, thermal welding, or by other suitable connection means.

This arrangement provides four (4) ports 710 to allow water poured through the center of the mechanical coupler 700 to pass through and out the ports 710 into the bottle portion when recharging the spray bottler dispenser with this arrangement.

This arrangement allows the inert 702 to be extruded continuously, since no lip need be molded in the insert 702. The insert 702 is provided with upper and lower sealing membranes (not shown) and then attached to the mechanical coupler 700 during assembly. Thus, the insert 702 can be cut from a continuous length of material extruded at high speed, filled with chemical concentrate, sealed with the sealing membranes at both ends, and then assembled with the mechanical coupler 700 to finish complete assembly.

What is claimed is:

1. A spray bottle dispensing system, comprising:

a spray bottle dispenser; and a plurality of separate reservoirs each configured for containing chemical concentrate, said plurality of separate reservoirs being associated with said spray bottle dispenser, said plurality of separate reservoirs configured to selectively recharge said spray bottle dispenser.

2. A system according to claim 1, wherein said plurality of separate reservoirs are packaged with said spray bottle dispenser.

3. A system according to claim 1, wherein at least one of said plurality of separate reservoirs is connected externally to said spray bottle dispenser.

4. A system according to claim 1, wherein at least one of said plurality of separate reservoirs is stored internally relative to said spray bottle dispenser.

5. A system according to claim 1, wherein at least one of said plurality of separate reservoirs is defined by a bottle portion of said spray bottle dispenser.

6. A system according to claim 1, wherein at least one of said plurality of separate reservoirs is defined by a sprayhead portion of said spray bottle dispenser.

7. A system according to claim 1, wherein at least one of said plurality of separate reservoirs is defined by a downtube portion of said spray bottle dispenser.

8. A system according to claim 1, wherein said plurality of separate reservoirs are defined by a container having multiple chambers.

9. A system according to claim 8, wherein said container is an insert.

10. A system according to claim 1, wherein said plurality of separate reservoirs are defined by separate containers.

11. A system according to any one of claims 1, 3 and 4–11, including chemical concentrate contained in said plurality of separate containers.

* * * * *